Aug. 16, 1932.     L. V. CRAM ET AL     1,871,779
HOOD CATCH
Filed Aug. 3, 1931
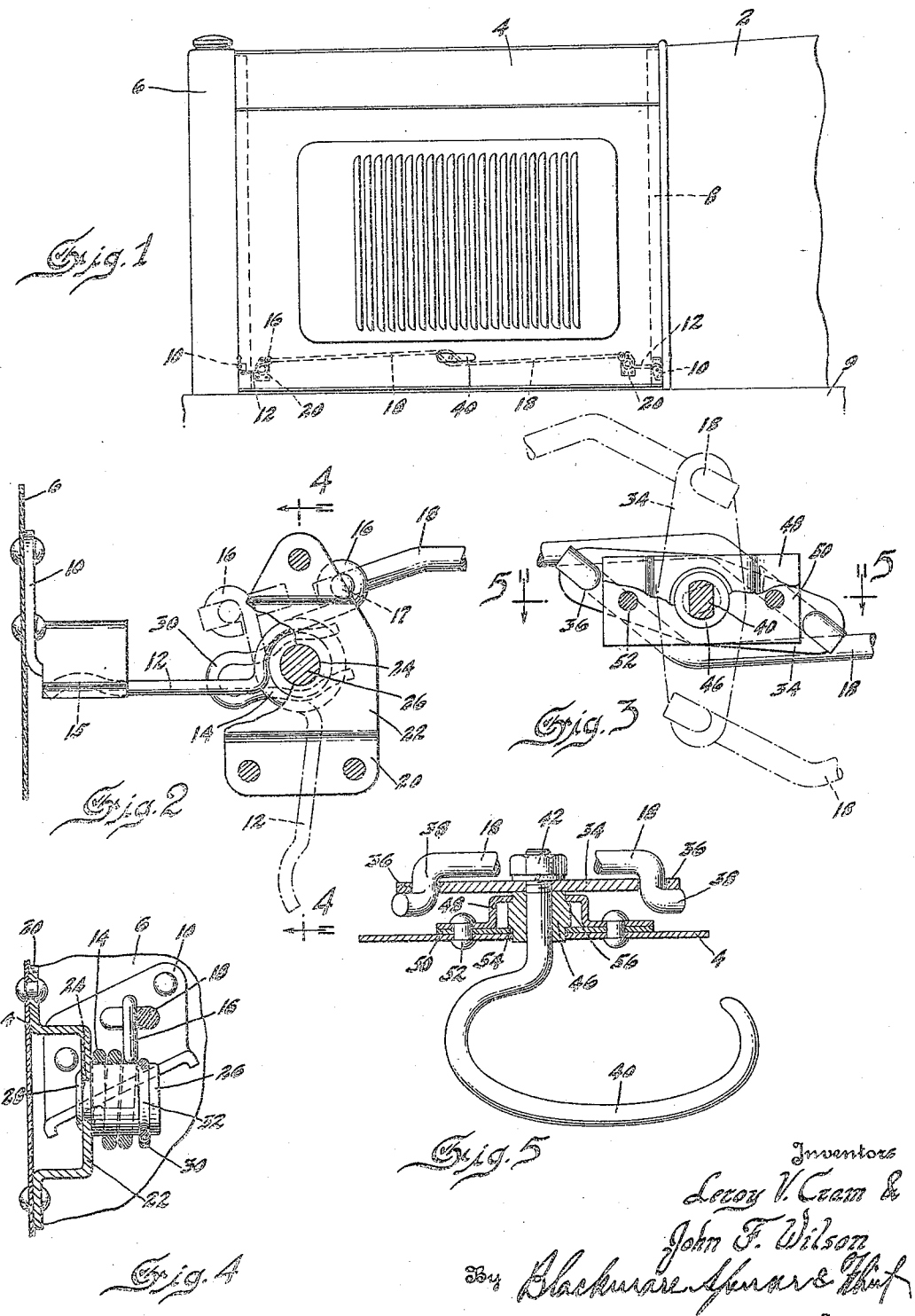

Patented Aug. 16, 1932

1,871,779

UNITED STATES PATENT OFFICE

LEROY V. CRAM AND JOHN F. WILSON, OF DETROIT, MICHIGAN, ASSIGNORS TO GENERAL MOTORS CORPORATION, OF DETROIT, MICHIGAN, A CORPORATION OF DELAWARE

HOOD CATCH

Application filed August 3, 1931. Serial No. 554,781.

This invention relates to hood catches and has particular reference to catches used to hold down the hoods of automotive vehicles.

The object of the invention is to combine the operating means for the usual plurality of hood catches to a single handle and to form a hood catch which is resilient and which is composed of a spring member. The hook or catch of the invention comprises a spring which is coiled about a pivot and has one end adapted to engage under a bracket which is secured to the radiator shell or to the dashboard. The other end of the hook is pivoted to an operating link which extends to the middle of the hood and is operated by a handle.

On the drawing:

Figure 1 shows the side view of the hood of an automotive vehicle with the invention applied.

Figure 2 is an enlarged detail view of the bracket and hook with their operative position shown in full lines and the inoperative position in dotted lines.

Figure 3 is an enlarged detail view of the interconnection between the links which operate the hood hooks.

Figure 4 is a section on the line 4—4 of Figure 2.

Figure 5 is a section on the line 5—5 of Figure 3.

Referring to the drawing, the numeral 2 indicates the cowl of an automotive vehicle, 4 the hood, 6 the radiator shell, 8 the dashboard and 9 the chassis. Secured to the shell 6 and dashboard 8 are the brackets 10 which are adapted to receive the hooks or catches 12 of the invention.

The particular novelty of the invention resides in the hook 12. The hook comprises a spring, the central portion 14 of which is coiled. One end 15 engages under the bracket 10, the other end 16 is preferably formed into an eye and receives the bent end 17 of a link 18.

On the inside of the hood at its lower portion and adjacent the brackets 10, there are secured the mounting brackets 20. The brackets 20 have the raised portion 22 provided with an opening 24 in which there is journally mounted the pivot or stud 26. The stud is secured to the raised portion 22 by the peened-over portion 28. The coil 14 of the spring hook 12 is turnably mounted on the pivot 26 and is held thereon by means of a U-shaped spring clip 30 positioned in a groove 32 in the pivot 26.

The links 18 extend to the center of the hood and are interconnected by means of a short throw arm 34. The ends of the short throw arm have openings 36 to receive the bent ends 38 of the links 18. The throw arm 34 is rigidly secured to a handle 40 by means of a nut 42. The handle 40 is journalled in the hood 4 by means of the bearing member 46 rigidly secured to the handle and journally mounted in the reinforcing members 48 and 50 secured to the hood by means of rivets 52. The bearing member 46 has the shoulders 54 formed by an enlarged central portion 56. The enlarged central portion 56 fits between the reinforcing members 48 and 50 and each shoulder 54 bears against the side of the reinforcing member 48 or 50.

The operation of the hood catch is as follows: The full line position of the parts in Figures 2 and 3 shows the locked position of the catch. It will be noted that the connection of the hooked end 38 in the opening 36 of the throw arm 34 is over-centered with reference to the axis of the handle 40. It will, therefore, be impossible to raise the hood against the over-centered connection. When the parts are in the position shown in Figures 2 and 3, the coil portion of the spring 14 will be under tension and will cause the hook 12 tightly to bear against the underside of the bracket 10 firmly to lock the hood in its down position. When the handle is turned counter-clockwise with reference to Figure 3, the throw arm 34 and links 18 will be moved to the dotted line position. This will swing the end 16 from the full line position in Figure 2 to the dotted line position which will give a movement to the hook 12 and end 15 from the full line position to the dotted line position. In this latter position of the parts, the hooks are free from the brackets 10 and the hood may be raised. To lock the hood, the parts are moved in the reverse direction.

We claim:

1. In a catch for the hoods of automotive vehicles, a plurality of brackets secured to relatively stationary parts of the vehicle, a plurality of hooks pivoted to the interior of the hood, one hook for each bracket, a plurality of links, said hooks each comprising a resilient member coiled intermediate its ends and having one end for engagement with the brackets and the other end pivotally connected to one of said links, means interconnecting said links, and means exterior to the hood and operating said interconnecting means to cause said links to move the hooks into engagement with or out of engagement from the brackets.

2. In a catch for the hoods of automotive vehicles, a plurality of brackets secured to relatively stationary parts of the vehicle, a plurality of resilient hooks pivoted to the interior of the hood, one hook for each bracket, said hooks each comprising a spring having free ends with its intermediary part coiled about the pivot, one end of said hooks being adapted to engage its cooperating bracket, links pivotally engaging the other end of the hooks and extending toward each other, means interconnecting the links, and a handle exterior to the hood connected to said means for operating the links to cause engagement and disengagement of said hooks with said brackets.

In testimony whereof we affix our signatures.

LEROY V. CRAM.
JOHN F. WILSON.